Jan. 7, 1941.   N. R. COLLINS   2,227,534
MANUFACTURE OF MAGNESIUM HYDROXIDE
Filed Feb. 21, 1938
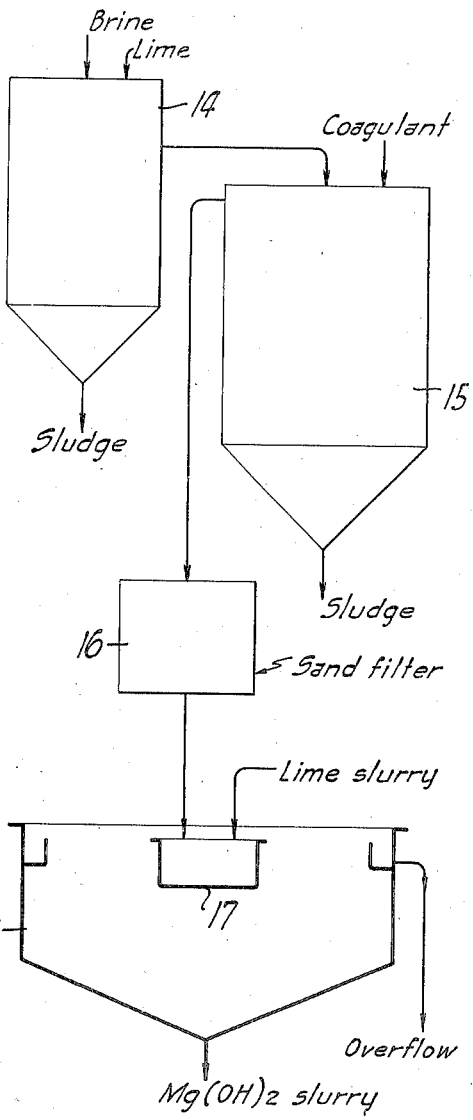
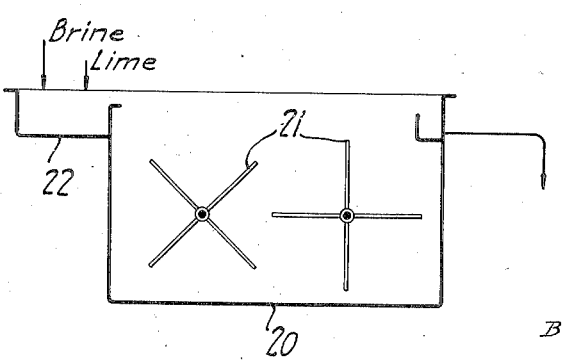
INVENTOR.
Neil R. Collins.
BY
ATTORNEY Patented Jan. 7, 1941

2,227,534

UNITED STATES PATENT OFFICE 2,227,534

MANUFACTURE OF MAGNESIUM HYDROXIDE

Neil R. Collins, San Francisco, Calif., assignor to Marine Magnesium Products Corporation, a corporation of Delaware Application February 21, 1938, Serial No. 191,594

1 Claim. (Cl. 23—201)

This invention relates generally to the manufacture of magnesium hydroxide from brines containing convertible magnesium salts. More particularly it relates to the manufacture of magnesium hydroxide from sea water or like brines containing fluorides, where a contaminating fluoride content in the final product is undesirable and to be minimized.

In the commercial manufacture of magnesium hydroxide and other magnesium products from brines like sea water, it has been customary to subject the brine to a pre-treatment for removal of certain impurities, after which the brine is reacted with a reagent like lime, to precipitate magnesium hydroxide. In this connection reference can be made to Farnsworth and Montgomery Patent No. 2,021,501, disclosing a commercial process where it is desired to secure a fast settling magnesium hydroxide precipitate of generally crystalline character, and Chesny Patent No. 2,089,339, disclosing a process also applicable to sea water, and which produces a relatively amorphous magnesium hydroxide of fairly high settling rate.

The type of brine pre-treatment disclosed in the aforesaid patents involves reacting the brine with lime, to cause precipitation of calcium bicarbonate as calcium carbonate. Precipitated calcium carbonate is then removed, thus minimizing calcium contamination in the final product. The amount of lime employed in such pre-treatment is sufficient to combine with the bicarbonate ion present, to effect substantially complete precipitation of the calcium carbonate. There is precipitated together with the calcium carbonate, a small amount of magnesium hydroxide, but this has been considered an undesirable feature because such magnesium hydroxide is removed before the brine is subjected to the final precipitating operation. Magnesium hydroxide removed at this point, is at the expense of the yield of magnesium hydroxide from the brine. Thus in practicing processes such as disclosed in Farnsworth et al. 2,021,501 and Chesny 2,089,339, on sea water, the amount of lime employed in the pre-treatment operation has been regulated so that less than about 5% of the available convertible magnesium salts are precipitated.

Operating substantially in accordance with Chesny 2,089,339, it has been found that the resulting magnesium hydroxide analysis is from about .0100 to .0175% fluorine content, irrespective of purification treatment of the settled magnesium hydroxide. Although filtering or washing methods, as for example a counterflow washing method such as disclosed in Farnsworth Patent No. 2,021,501 materially reduces certain impurities, like calcium content and sodium chloride, the fluoride content remains with the magnesium hydroxide. For many purposes such a fluoride content is objectionable.

In seeking methods to alleviate this difficulty, and to materially reduce the fluoride content in the finished magnesium hydroxide, it has been found that by substantially increasing the amount of lime used in the pre-treatment operation, the fluoride content can be substantially reduced. According to my observations, this effect is the result of absorption or adsorption of fluorides by the magnesium hydroxide present in the pre-treatment stages. Thus by the simple expedient of substantially increasing the amount of lime employed in the pre-treatment of the brine, fluoride contamination of the final magnesium hydroxide can be reduced below desired limits, without adding additional steps to the process.

In view of the foregoing it will be evident that the principal object of this invention is to reduce fluoride contamination in magnesium hydroxide precipitated from brines, like sea water.

Referring to the drawing,

Fig. 1 is a flow sheet, illustrating diagrammatically the carrying out of the present process.

Fig. 2 is a flow sheet illustrating a modification of the general process illustrated in Fig. 1.

Fig. 3 is a diagrammatic view illustrating a further possible modification of the process.

Referring first to the flow sheet of Fig. 1, brine such as sea water, containing convertible magnesium salts, calcium bicarbonate and fluorides, is subjected to a pre-treatment operation 10. In this pre-treatment a measured amount of lime is introduced into the brine, preferably in the form of a lime slurry. The amount of lime is such as to not only satisfy the bicarbonate ion present, thus causing precipitation of calcium carbonate, but to also cause precipitation of a substantial percentage of the convertible magnesium salts, thus precipitating relatively amorphous magnesium hydroxide which can be readily retained dispersed within the body of the brine.

The next stage 11 involves a period of retention of the magnesium hydroxide dispersed throughout and in intimate contact with the brine, whereby there is an absorption or adsorption of fluorides present, by the particles of magnesium hydroxide. Retention also serves to complete the reaction with the bicarbonate ion, to complete precipitation of calcium carbonate. Following this retention, which may continue for an effective period of two to six hours, solids are removed from the brine to produce a clarified brine for the final precipitating operation. Removal of solids can be conveniently carried out by sand filtration, or settlement and filtration. Solids removed include the precipitated calcium carbonate and magnesium hydroxide, together with other solids such as coagulated organic material. Removal of organic material may be aided by the use of well known coagulants, such as salts of iron or aluminum.

The next stage 12 is the main precipitating operation, to precipitate the remainder of the convertible magnesium salts as magnesium hydroxide. This precipitating operation can be carried out as disclosed in Farnsworth et al. 2,021,501, or Chesny 2,089,339, depending upon the character of the precipitate desired. Assuming that it is desired to obtain a relatively amorphous form of precipitate, the process of Chesny 2,089,339, is preferred. Thus the precipitant employed is highly reactive lime slurry, which is commingled with the lime slurry in such a manner as to form a relatively rapid settling precipitate. The precipitated magnesium hydroxide is permitted to settle through the mother liquor, and is removed from the lower part of the precipitating tank, as a concentrated slurry.

The slurry of precipitated magnesium hydroxide obtained by operation 12, can be subjected to a further purification operation 13. For this purpose it is desirable to make use of the purifying apparatus and method disclosed in Farnsworth 2,021,501, wherein soluble impurities including sodium chloride, and some remaining calcium content, are removed by leaching with fresh water.

The washing or purifying operation 13 results in the final purified magnesium hydroxide slurry, which can be treated to form other magnesium products, such as powdered magnesium hydroxide, magnesium carbonates, and magnesium oxides.

As an example of commercial operations in accordance with the present process, about 3.5 lbs. of calcium oxide, slaked to form a slurry, has been used for the pre-treatment of each 1000 gallons of brine. The brine was San Francisco Bay water, containing approximately 2.75% sodium chloride content, and having a specific gravity of 1.025. The effective retention time during pre-treatment was about 2 hours. Upon analysis of the final precipitated magnesium hydroxide, (on a dry basis), it was found to contain from .002 to .0025% fluorine.

In order to properly appreciate the results of the present process, as distinguished from prior practice, pre-treatment of the same brine with approximately 1.5 lbs. of calcium oxide per 1000 gallons of brine, in a pretreatment operation intended only for the removal of calcium bicarbonate and organic solids, will afford a final precipitated magnesium hydroxide having about .0125 to .015% fluorine content.

In practice I prefer to so adjust the amount of lime used in the pretreatment operation, that from about 10 to 25% of the available convertible magnesium salts, are precipitated as magnesium hydroxide. From about 12 to 20% is an optimum range, affording only a slight percentage of fluorine in the final magnesium hydroxide, without too great a sacrifice of the available magnesium hydroxide in the original brine. In the foregoing commercial example of the present process the amount of lime employed is sufficient to precipitate approximately 15% of the convertible magnesium salts, in the pretreatment operation. In the above example of prior practice about 5% of the magnesium salts were precipitated during pretreatment.

Fig. 2 illustrates more specifically a procedure which can be followed in the pretreatment and precipitation of the brine. The source of brine is supplied to the storage tank 14, into which the pretreatment lime is also introduced. Within this tank liquid is subjected to some agitation, to insure proper reaction and to maintain the precipitated magnesium hydroxide in suspension. Some heavier solids, including heavy foreign solids and organic material, settle out in this tank, and can be removed from the bottom of the tank as a sludge.

From storage tank 14, the brine is supplied to the treatment tank 15, where it is intermixed with a suitable coagulant, such as ferrous sulphate. While in this tank there is further opportunity for intimate contact between the precipitated magnesium hydroxide and the brine, to enable absorption, or adsorption of fluorides, by the particles of magnesium hydroxide. Some sludge is also formed in this tank, and can be removed from the lower end of the tank, to avoid subsequent removal in the filtration operation. The overflow from tank 15 is supplied to the sand filter 16, where remaining solids are removed, including remaining precipitated calcium carbonate, and magnesium hydroxide. The clarified brine from the sand filters 16, is then supplied to the reaction container 17, which is positioned within the main precipitating tank 18. Lime slurry is also supplied to the reaction box 17, and by virtue of the intermixing and commingling within box 17, magnesium hydroxide is precipitated. The amount of lime employed is sufficient to react with all or a substantial portion of the remaining convertible magnesium salts. From box 17, liquid together with flocs of precipitated magnesium hydroxide flow outwardly below the surface of the mother liquor, and the magnesium hydroxide settles to the lower portion of the tank, where it is removed as a thickened slurry.

Fig. 3 illustrates a type of equipment which can be substituted in place of the retention or storage tank 14, of Fig. 2. In this instance tank 20 is provided with slowly rotating vanes 21. The brine to be treated is introduced into the inflow launder 22, together with the pretreatment lime. The slowly rotating vanes 21 within the tank 20 tend in effect to activate precipitation of calcium carbonate, and absorption of fluorides by the magnesium hydroxide, thus effecting a saving in retention time and size of the equipment. The effluent for tank 20 can be supplied to tank 15 of Fig. 2.

I claim:

In a process for the manufacture of magnesium hydroxide from sea water, the steps of reacting normal sea water with lime to precipitate calcium bicarbonate as calcium carbonate and to react with a substantial but minor part of the magnesium salts to precipitate magnesium hydroxide, the amount of lime employed being sufficient to precipitate the calcium bicarbonate as calcium carbonate and to afford an excess sufficient to precipitate from about 12 to 20% of the convertible magnesium salts present, maintaining the precipitated magnesium hydroxide dispersed throughout the body of the sea water with a period of retention to cause absorption of the fluorides present, removing precipitated calcium carbonate and magnesium hydroxide from the brine, and then reacting the brine with lime to precipitate the remaining magnesium salts as magnesium hydroxide.

NEIL R. COLLINS.